United States Patent
Magee et al.

(10) Patent No.: US 7,349,667 B2
(45) Date of Patent: Mar. 25, 2008

(54) SIMPLIFIED NOISE ESTIMATION AND/OR BEAMFORMING FOR WIRELESS COMMUNICATIONS

(75) Inventors: David Patrick Magee, Plano, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 729 days.

(21) Appl. No.: 10/044,638

(22) Filed: Oct. 19, 2001

(65) Prior Publication Data
US 2003/0078024 A1 Apr. 24, 2003

(51) Int. Cl.
*H04B 1/00* (2006.01)
*H04B 15/00* (2006.01)
(52) U.S. Cl. .................................... 455/63.4
(58) Field of Classification Search ................ 455/501, 455/63.1, 65, 67.11, 278.1, 283, 295, 63.4
See application file for complete search history.

(56) References Cited
U.S. PATENT DOCUMENTS

| | | | |
|---|---|---|---|
| 5,933,421 A | 8/1999 | Alamouti et al. ........... 370/330 |
| 6,006,110 A * | 12/1999 | Raleigh ....................... 455/561 |
| 6,018,643 A | 1/2000 | Golemon et al. ............. 455/63 |
| 6,236,838 B1 | 5/2001 | Golemon et al. .......... 455/67.1 |
| 6,377,636 B1 * | 4/2002 | Paulraj et al. ............... 375/346 |
| 6,711,412 B1 * | 3/2004 | Tellado et al. .............. 455/506 |
| 6,795,409 B1 * | 9/2004 | Youssefmir et al. ........ 370/328 |

FOREIGN PATENT DOCUMENTS

| EP | 0 762 703 A1 | 3/1997 |
|---|---|---|
| GB | 2 326 069 A | 12/1998 |

OTHER PUBLICATIONS

Chan Kyu Kim, et al., "Adaptive Beamforming for an OFDM System," Vehicular Technology Conference, 1999 IEEE 49th, Houston, TX May 16-20, 1999, Piscataway, NJ, May 16, 1999, pp. 484-488.

* cited by examiner

*Primary Examiner*—Curtis Kuntz
*Assistant Examiner*—Alexander Jamal
(74) *Attorney, Agent, or Firm*—Steven A. Shaw; W. James Brady; Frederick J. Telecky, Jr.

(57) ABSTRACT

A system and method facilitate estimating noise in a received signal. The received signal is formed of a plurality of tones, such as training tones and data tones. Noise is estimated at the training tones, which generally comprise a lesser number of the tones in the received signal than the data tones. The estimated noise at the training tones can be employed to facilitate demodulating and/or decoding data tones in the received signal. In one aspect, the estimated training tone noise can be utilized by a beamformer.

18 Claims, 4 Drawing Sheets

FIG. 2

| Pin |
|---|
| T0 |
| Z0 |
| Z1 |
| Z2 |
| Z3 |
| Z4 |
| D12 |
| D38 |
| T1 |
| D22 |
| D9 |
| D35 |
| D3 |
| D29 |
| D16 |
| D42 |
| T2 |
| D20 |
| D7 |
| D33 |
| D1 |
| D27 |
| D14 |
| D40 |
| T3 |
| D24 |
| D11 |
| D37 |
| D5 |
| D31 |
| D18 |
| D44 |
| T4 |
| D19 |
| D6 |
| D32 |
| D0 |
| D26 |
| D13 |
| D39 |
| T5 |
| D23 |
| D10 |
| D36 |
| D4 |
| D30 |
| D17 |
| D43 |
| T6 |
| D21 |
| D8 |
| D34 |
| D2 |
| D28 |
| D15 |
| D41 |
| T7 |
| D25 |
| Z5 |
| Z6 |
| Z7 |
| Z8 |
| Z9 |
| Z10 |

| Pin |
|---|
| T0 |
| T4 |
| T2 |
| T6 |
| T1 |
| T5 |
| T3 |
| T7 |
| Z3 |
| D0 |
| D1 |
| D2 |
| D3 |
| D4 |
| D5 |
| Z7 |
| Z1 |
| D6 |
| D7 |
| D8 |
| D9 |
| D10 |
| D11 |
| Z5 |
| D12 |
| D13 |
| D14 |
| D15 |
| D16 |
| D17 |
| D18 |
| Z9 |
| Z0 |
| D19 |
| D20 |
| D21 |
| D22 |
| D23 |
| D24 |
| D25 |
| Z4 |
| D26 |
| D27 |
| D28 |
| D29 |
| D30 |
| D31 |
| Z8 |
| Z2 |
| D32 |
| D33 |
| D34 |
| D35 |
| D36 |
| D37 |
| Z6 |
| D38 |
| D39 |
| D40 |
| D41 |
| D42 |
| D43 |
| D44 |
| Z10 |

SIMPLIFIED NOISE ESTIMATION AND/OR BEAMFORMING FOR WIRELESS COMMUNICATIONS

TECHNICAL FIELD

The present invention relates generally to processing of communications signals and, more particularly, to a system and method to simplify noise estimation and/or beamforming in a communications system.

BACKGROUND OF THE INVENTION

Various techniques have been developed to facilitate communication of data signals over an associated communications path. The particular communications protocol employed generally depends on the transmission medium, the available bandwidth resources, and other design considerations. Regardless of the type of communications system being employed, noise and distortion often are introduced into data signals transmitted over an associated communications path, including both wired and wireless systems.

Wireless communications systems, such as cellular and personal communications systems, operate over limited spectral bandwidths. Accordingly, multiple access protocols have been developed and used in wireless communications systems to increase bandwidth efficiency. Examples of multiple carrier protocols include Frequency Division Multiple Access (FDMA), Time Division Multiple Access (TDMA), Code Division Multiple Access (CDMA), and Space Division Multiple Access (SDMA). A particular type of FDMA protocol is Orthogonal Frequency Division Multiplexing (OFDM). Features from these and other multiple-access techniques also have been combined in an effort to make highly efficient use of the scarce bandwidth resource to increase the quality of service.

In a wireless system, in which data signals are transmitted through space as modulated electromagnetic waves, distortion and noise can result from interference with other signals within the same frequency range and path as well as multipath dispersions. Multipath dispersions occur when signals propagate along different or reflected paths through a transmission medium to a receiving destination. For example, radio transmissions or data signals that travel through the space can be reflected off trees, vehicles, houses, larger buildings, and terrain features such as mountains and hills. The radio transmissions further are subjected to fading and interference. Fading involves fluctuations in amplitude of a signal, while interference involves unwanted frequencies in the same frequency band.

Multipath scattering effects alter or distort the signal spectrum when compared to the spectrum as transmitted. The effects are different at different frequencies across the signaling band. At some frequencies, the multipath signals add constructively to result in an increased signal amplitude, while at other frequencies the multipath signals add destructively (out of phase) to cancel or partially cancel the signal, resulting in reduced signal amplitude.

A wireless communication system is designed to compensate for interference due to noise and the deleterious effects of multipath dispersion. However, in order to compensate for the noise, an indication of the noise in the signal must first be determined. Thus, it is desirable to know how much noise and/or interference is present in the system. Generally, noise can be measured relative to the signal as a ratio, such as a signal-to-noise ratio (SNR) and a signal-to-interference-to-noise ratio (SINR). The noise/interference levels are monitored and used to facilitate demodulation of the incoming signal, such as by assigning a confidence level to the data tones of the received signal. Accordingly, it is desirable to efficiently and accurately estimate the noise/interference in a received signal.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a noise estimator that can be employed in a receiver to simplify noise estimation computations. The noise estimator includes a component that extracts training tones from a digitized signal having more than one type of tone. For example, a channel estimator can extract the training tones in a desired manner and provide the training tones to subsequent processing section(s) of the noise estimator. The noise estimator, in turn, computes an indication of the noise for at least a substantial portion of the respective training tones.

According to a particular aspect, the noise estimation can include computing a difference between a given training tone in one data signal and the same training tone in a preceding data signal. Additionally, a covariance can be computed for the computed differences for at least a substantial portion of the training tones to provide a desired indication of noise in the training tones. Because the training tones are distributed throughout the spectrum of the received signal, they provide a good indication of the noise at their respective locations in the signal. As a result of performing the noise estimates at the training tones, which are substantially fewer than the total number of tones in the digitized signal, the number of computations can be significantly reduced, thereby improving system performance.

Another aspect of the present invention provides a beamforming system. The beamforming system employs an indication of estimated training tone noise, such as described above, to perform beamforming computations for data tones of a received signal. In one particular aspect, given a data tone, a determination is made to locate a nearest training tone relative to the give data tone. The noise estimate for the nearest training tone is employed in the beamforming computation for the given data tone. As a result of employing training tone noise estimates in the beamforming computations for the data tones, computational efficiency further can be increased with little, if any, loss in accuracy.

Yet another aspect of the present invention provides a methodology for processing a digitized signal having training tones and other tones (e.g., data tones, zero tones, etc.). The training tones are isolated from the digitized signal and a noise estimation is provided for each of the isolated training tones. The estimated training tone noise can then be employed in subsequent processing, such as can include a computationally efficient beamforming procedure in accordance with an aspect of the present invention.

The following description and the annexed drawings set forth in certain illustrative aspects of the invention. These aspects are indicative, however, of but a few ways in which the principles of the invention may be employed. Other advantages and novel features of the invention will become

DETAILED DESCRIPTION OF THE INVENTION

The present invention provides a system and method to estimate noise in a received signal, such as received over a wired (e.g., electrically conducting or optical) or wireless medium. In the frequency domain, the received signal is formed of a data signal or burst that includes training tones and data tones. Noise is estimated at the training tones. The estimated noise can be employed to facilitate demodulating and/or decoding data tones in the received signal. In one aspect, the estimated noise at the training tones can be utilized by a beamformer to determine an indication of signal and noise characteristics, such as soft decisions and NSR estimates. For example, beamforming computations can be determined for each data tone in the received signal as a function of the computed noise estimate at a nearest training tone. Because the training tones usually are distributed throughout the spectrum of the received signal, they provide a good indication of the noise at their respective locations in the signal. As a result of only performing noise estimates at the training tones, the number of computations can be significantly reduced, thereby improving system performance.

Figure 1:
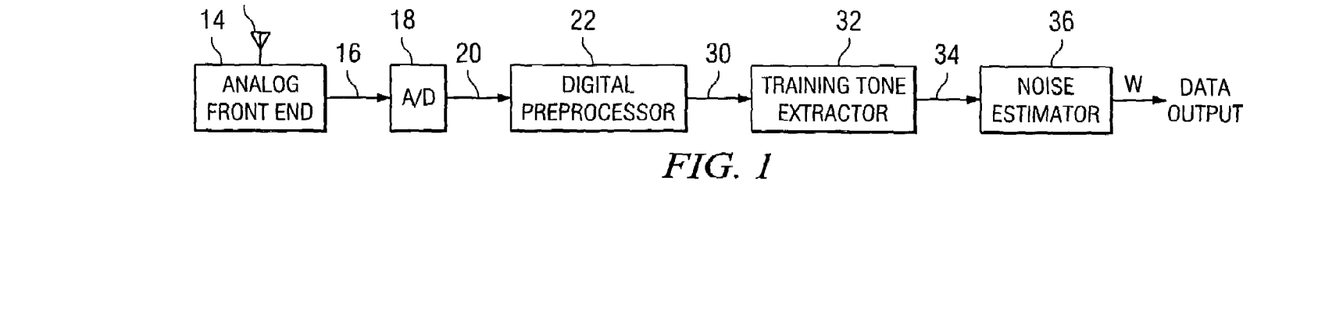
FIG. 1 is a functional block diagram of a receiver that includes a noise estimator in accordance with an aspect of the present invention.

FIG. 1 illustrates a schematic block diagram of a wireless receiver system 10 in accordance with an aspect of the present invention. The receiver system 10 could be implemented within a subscriber unit and/or at a head end or base station of a wireless communications system. A data signal or burst is received at an antenna 12, which captures the data signal and transmits the data signal to an analog front end 14, which can include one or more processing components. The analog front end processor 14, for example, can be programmed and/or configured to amplify the data signal, convert the data signal to an intermediate frequency (IF) and filter the data signal to eliminate signals that are outside of the desired frequency band. It is to be appreciated that many variations in receiver front end processing exist. For example, some receiver front end processing includes utilizing multiple IF frequencies and successive frequency conversions. Additional, some receivers can provide direct radio frequency (RF) sampling without IF stages.

The analog front end processor 14 feeds a processed analog signal 16 to one or more analog-to-digital (A/D) converters 18. The A/D converter 18 samples the analog data signal 16 at a predetermined sampling rate and provides a corresponding digitized output signal 20. The front end processor 14 also can provide automatic gain control (AGC), as is conventional, to maintain the signal strength relative to the A/D converter 18.

The A/D converter 18 is coupled to a digital preprocessor 22 that receives the digitized output signal 20. The digital preprocessor 22, which can include a Finite Impulse Response (FIR) filter, provides additional filtering of the digitized signal 20 and reduces or decimates the sample of the digitized signal. The digital preprocessor 22 also can include digital automatic gain control to help ensure that the signal is maintained at a desired power level. The digital preprocessor 22 can include other signal processing components for converting the digitized signal 20 from the time domain to the frequency domain.

By way of example, the digital preprocessor 22 is programmed and/or configured to perform a Fast Fourier Transform (FFT) on the digitized signal 20. The FFT on the digitized signal converts the signal from the time domain to the frequency domain to facilitate processing of the frequencies or tones carrying data. The exact implementation of the digital preprocessor 22 can vary depending on the particular receiver architecture and the modulation technique being employed. Once in the frequency domain, the frequencies or tones can then be further processed and demodulated.

The frequency domain usually includes tones or frequencies modulated onto carriers according to the particular communications protocol and modulation scheme being implemented. Of particular interest are multiple carrier protocols, which allow multiple users to reuse the same communications resources while maintaining the identity of each user. One special case of multiple carrier protocol is referred to as Orthogonal Frequency Division Multiplexing (OFDM). In general, OFDM is a block-oriented modulation scheme that maps a number of data symbols into a number of orthogonal carriers separated by a distance 1/T, where T is a block period. OFDM is a technique by which data is transmitted at a high rate by modulating several low bit rate carriers in parallel rather than one single high bit rate carrier. OFDM is particularly useful in the context of Digital Audio Broadcasting, High Definition Television (HDTV), and Asymmetric Digital Subscriber Lines (ADSL), all of which can benefit from the present invention. OFDM can also be useful in satellite television systems, cable television, video on demand, interactive services, mobile communication devices, voice services and Internet services.

An important advantage of OFDM is that intersymbol interference due to signal dispersion in the transmission channel can be reduced by inserting a guard time interval, known as the cyclic prefix, between the transmission of subsequent bursts. This helps remove intersymbol interference, thereby alleviating the need for equalizers as required by most single carriers. The guard time allows delayed copies (e.g., reflections) of the main symbol to die out before the receiver receives the succeeding symbol. Due to this property, OFDM has gained popularity in high data rate systems including wireless broadband applications.

In transmission of a data signal, an OFDM modulator converts a serial data stream into a block of N complex carriers. The sum of the individual carriers, of which amplitude and phase can be modulated, correspond to a time domain waveform that can be generated using an Inverse Discrete Fourier Transform (IDFT). The Inverse Fast Fourier Transform (IFFT) is a well known efficient implementation of the IDFT that performs an N-point IDFT transform, where N is the number of tones. The guard time is inserted into the output of the IDFT and filled in with a copy of the symbol (called a cyclic prefix) to preserve the orthogonality between carriers. At the receiver end, a data signal or data burst is received in the time domain and converted back into the frequency domain employing an FFT for extraction of the symbols from the data burst. The frequency domain signal is comprised of a plurality of data tones, training tones and zero tones. The training tones are transmitted at known magnitude and phase and employed in determining the channel estimate for use in compensating the data tones due to the effects of the channel on the tones.

Figure 2:
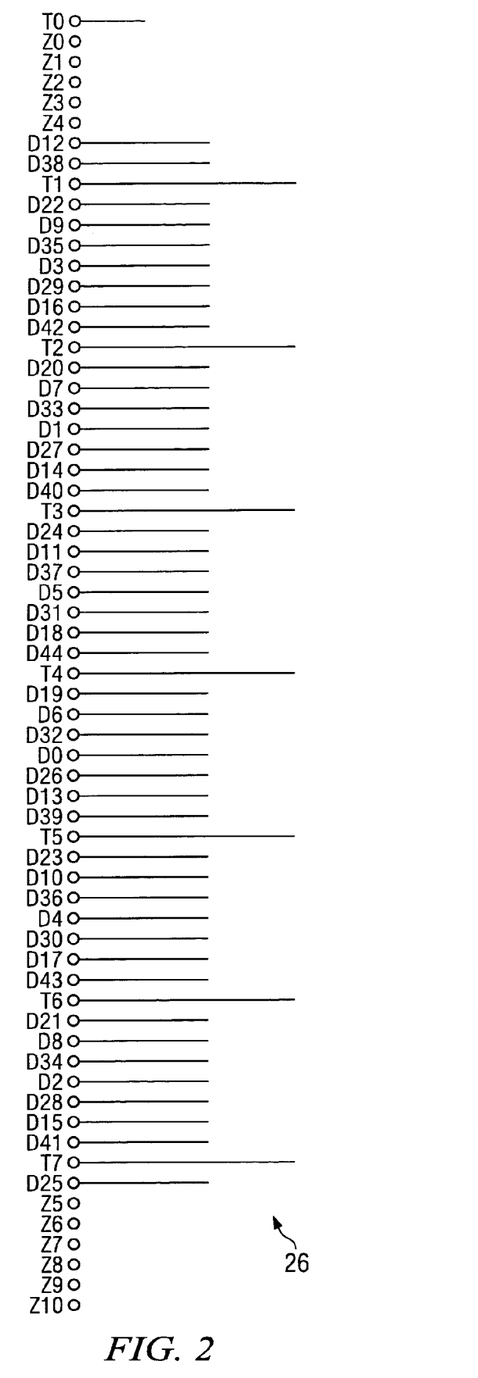
FIG. 2 is an example of a data burst showing different types of tones in a transmission signal.

By way of further example, in an OFDM based communications system, data bursts divide the OFDM carriers into a plurality of N tones. FIG. 2 illustrates an example of a frequency-domain representation of a Quadrature Amplitude Modulation (QAM) data burst 26 in which N tones are arranged in linear order. The training tones (e.g., indicated as T0 through T7) include the leftmost carrier, and are generally evenly spaced apart with an interval of N/v carriers, where v is the number of training tones. Of the remaining N−v carriers, $N_{data}$ contain data tones (e.g., indicated as D0 through D44), and $N_{zero}=N-v-N_{data}$ contain zero tones (e.g., indicated as Z0 through Z10). The zero tones are divided between the band edges. In the example of FIG. 2, $\lfloor N_{zero}/2 \rfloor$ zero tones are placed at the left band edge, and $\lceil N_{zero}/2 \rceil$ zero tones are placed at the right band edge. Data tones occupy the remaining carriers in the center, which are interspersed with training tones.

The scrambled indexing of the data tones represents the frequency interleaving obtained through bit reversal. The input that is provided to the digital preprocessor 22 thus assumes that the burst is arranged in a predetermined order so as to enable extraction and processing of the different types of tones. To facilitate processing of the data burst, the tones can be accepted and/or stored in bit-reversed order, such the burst data 28 depicted in FIG. 3. In the bit-reversed order of FIG. 3, the training tones occupy the first v inputs. The QAM symbols of the data tones are indexed in consecutive order and zero tones are inserted as appropriate.

Figure 3:
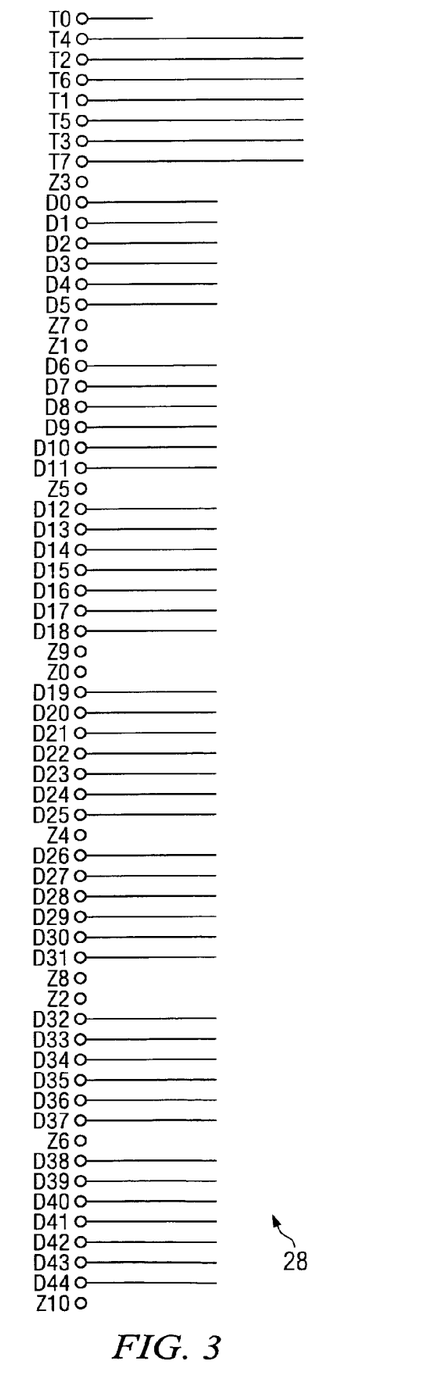
FIG. 3 is an example of a data burst, similar to that of FIG. 2, in which the order of the tones has been modified.

It is to be understood and appreciated that the data burst examples in FIGS. 2 and 3 are intended only for purposes of illustration and that the present invention can be implemented with respect to any type of communications protocol (e.g., QAM technique) that employs training or pilot tones interspersed with other types of tones.

Referring back to FIG. 1, the digital preprocessor 22 provides a filtered, frequency domain burst data signal 30 to a training tone extractor 32 in accordance with an aspect of the present invention. Any modulation (e.g., rotation) imposed on the training tones further can be removed by appropriate demodulation. For example, the training tone extractor 32 can extract the training tones from the data burst signal 30 provided in bit-reversed order, such as shown in FIG. 3. Additionally, a channel estimation procedure can be implemented to extract training tones and mitigate the effects of the interference and distortion caused by transmission of the received signal. It is to be appreciated that any channel estimation procedure can be implemented relative to the extracted training tones. The training tone extractor 32 provides an indication of the extracted training tones 34 to a noise estimator 36, although it is to be appreciated that a training tone extraction or isolation procedure can be integrated into the noise estimator 36 in accordance with an aspect of the present invention.

The noise estimator 36 is programmed and/or configured to compute an estimate of noise at training tones in the received data burst. The training tones usually comprise less than one-half the total number other tones in the data burst. Typically, noise is estimated for the training tones in each data burst, although it is to be appreciated that noise estimates also could be computed for a smaller sample of the training tones or, alternatively, they could be computed for more tones than just the training tones in accordance with an aspect of the present invention. Because the noise estimates are computed for training tones spaced throughout the data burst, the noise estimates provide a good approximation for noise associated with other adjacent tones (e.g., data tones and zero tones) that are located near the respective training tones. Additionally, such a procedure is more computationally efficient because the noise estimation is performed on less than all the data tones. The noise estimator 36 provides an output W, which contains an estimate of the noise at the training tones, which values can be used in subsequent demodulation and decoding of the signal.

Figure 4:
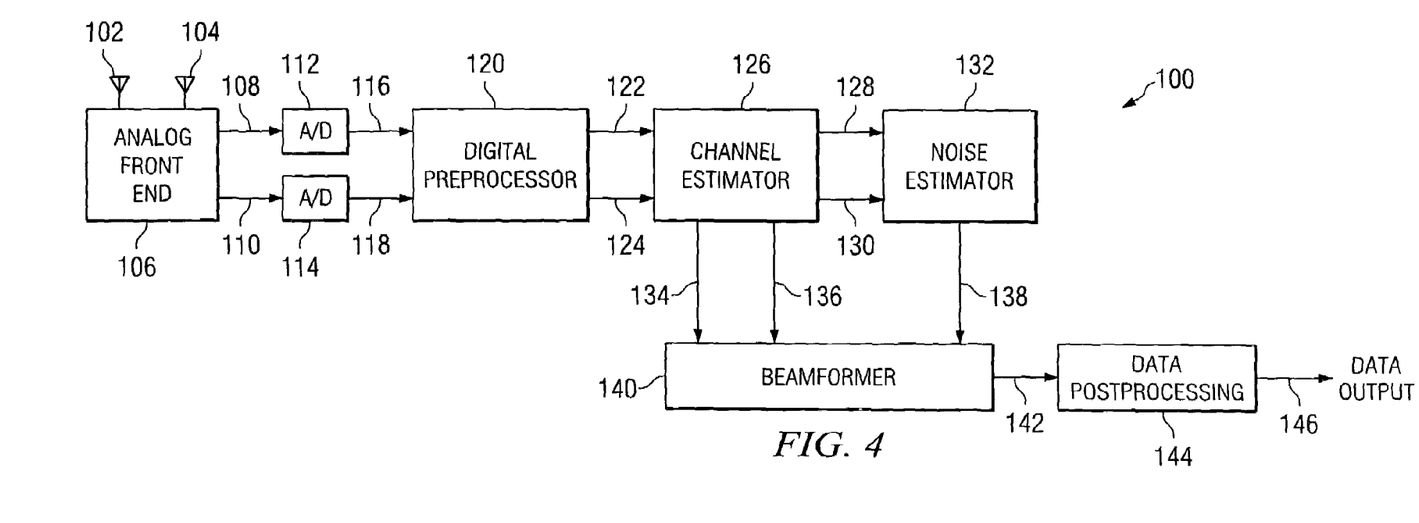
FIG. 4 is a functional block diagram of a receiver that includes a noise estimator and beamformer in accordance with an aspect of the present invention.

FIG. 4 illustrates an example of another wireless receiver system 100 implemented in accordance with an aspect of the present invention. The receiver system 100 is similar to the system 10 shown and described with respect to FIG. 1 and could be implemented within a subscriber unit and/or at a head end or base station of a wireless communications system. Briefly stated, a wireless data signal is received at a pair of antennas 102 and 104 coupled to an analog front end 106. The analog front end 106, for example, can be programmed and/or configured to amplify and convert the data signals from each antenna 102, 104 to an intermediate frequency (IF). The analog front end 106 further can filter the respective data signals to eliminate undesirable signals.

The front end processing component 14 feeds processed analog signals 108, 110 to respective A/D converters 112, 114 associated with each antenna 102, 104. The A/D converters 112, 114 sample the analog data signals 108, 110 at a predetermined sampling rate and provide respective digitized output signals 116, 118.

The A/D converters 112 and 114 are coupled to a digital preprocessor 120 that receives the digitized output signals 116, 118. The digital preprocessor 22 provides additional filtering of the digitized signals 116 and 118, such as to reduce the sample of the digitized signals. The digital preprocessor 120 also can include digital automatic gain control to help ensure that the signals are maintained at a desired power level. The digital preprocessor 120 also can include other signal processing components for converting the digitized signals 116 and 118 from the time domain to the frequency domain, such as by implementing an FFT algorithm. The particular implementation of the digital preprocessor 120 can vary, for example, depending on the particular receiver architecture and/or modulation scheme being employed.

The digital preprocessor 120 provides processed frequency domain signals 122 and 124 to a channel estimator 126 after having amplified, filtered, digitized, decimated and/or converted the signals 116 and 118 into the frequency domain by applying an FFT algorithm. The channel estimator 126 is programmed and/or configured to provide an indication of how the communication channel modified the magnitude and phase of the training tones (or pilot tones) in the data bursts received at the antennas 102 and 104. The training tones are transmitted at a known magnitude and phase and are typically interspersed in the data signals at spaced carriers. Accordingly, properties of the training tones can be analyzed to determine the effects of the environment on the training signals, which when interspersed with the data tones, can be used to facilitate a computationally efficient estimate of noise at the data tones in accordance with an aspect of the present invention.

By way of example, the channel estimator 126 receives digitized signals (e.g., conforming to OFDM) 122 and 124 for the respective antennas 102 and 104. The resultant digitized format consists of a plurality of zero tones, and a plurality of training tones dispersed amongst a plurality of data tones according the modulation scheme being employed. The channel estimator 126 includes a training tone extractor that extracts the training tones from the data burst. The channel estimator 126, which outputs contain intermediate channel responses for the respective input signals 122 and 124, can provide outputs 128 and 130 to a noise estimator. A phase demodulator also can be used to remove phase modulation from the extracted training tones (e.g., when the training tones are modulated with data) prior to providing the signals 128 and 130 to the noise estimator 132.

As shown in FIGS. 2 and 3, the first tone of the training tones can be transmitted with reduced magnitude and the channel estimator 126 can employ scaling also to provide a common magnitude for the training tones. An IFFT further can be performed on the training tones to obtain time domain samples of the channel impulse response for the respective signals 122 and 124. The training tones are initially transmitted with magnitudes larger than the unity for signal to noise reasons. The impulse response is then globally rescaled by a unity scale to adjust the channel amplitude to reflect unity training tones. The rescaled channel response can be averaged with previous channel responses by an averager (e.g., a single pole filter). A FFT is performed on the averaged impulse response to provide the channel estimates 134 and 136 associated with the signal received at the respective antennas 102 and 104.

The noise estimator 132 is programmed and/or configured to compute an indication of noise for the training tones provided in the frequency domain signals 128 and 130. Usually, noise is estimated for each training tone in each data burst, although it is to be appreciated that noise estimates also could be computed for a smaller sample of the training tones and/or a larger sample of selected other tones (e.g., although a reduced set of the available tones) in accordance with an aspect of the present invention. The noise estimate is computed for each training tone, for example, as a function of the intermediate channel estimate for a given burst and one or more previous channel estimates for that training tone, such as a comparison of respective training tone values in adjacent data bursts. The noise estimation further can include synchronization, such as applied to the previous channel estimate being employed in the noise estimation, to adjust for slip of a data burst that can occur at high data rates. A variance and correlation further can be performed on the noise estimates for each of the antenna signals to provide a matrix indicative of the noise estimates for the training tones in the respective received signals. Time averaging also can be employed to smooth the noise estimates 138.

The noise estimator 132 provides the training tone noise estimation 138 to a beamformer 140. The channel estimator 126 also provides the channel estimates 134 and 136 for the respective antennas 102 and 104 to the beamformer 140. The beamformer 140 is programmed and/or configured to compute an indication of the signal relative to the noise based on the noise estimates 138 at the training tones and the channel estimates 134 and 136 from the channel estimator 126.

In accordance with a particular aspect, the beamformer 140 computes soft decisions and NSR estimates for each data tone in the data burst based on the noise estimate of the nearest neighbor training tone. That is, the beamformer 140 employs a selection function to select which training tone is a nearest neighbor for a given data tone. The selection function can include rounding (e.g., up or down) for situations when a data tone is midway between an adjacent pair of training tones. The computed noise estimate for the selected nearest training tone is then employed to compute the soft decisions and NSR estimates for that given data tone. An iterative process can be employed to perform similar beamforming computations for each data tone.

Because the noise estimates are computed for training tones spaced throughout the data burst, the noise estimates provide a good approximation of noise for the data tones that are located nearest the respective training tones. Additionally, because the data tones are usually greater in number than the training tones, such a procedure is more computationally efficient because it allows noise estimates to be computed for the training tones, rather than all data tones in a data burst. The additional overhead associated with determining the nearest training tone for a given data tone is significantly less than that required to compute a corresponding noise estimate for each data tone.

The beamformer 140 provides an output 142 to a data postprocessing block 144, which output, for example, contains the computed soft decisions and NSR estimates. The data postprocessing block 144 can include slicing for bit constellation mapping data. Additionally or alternatively, the data postprocessing block 144 can performs error correction and decoding of the weights associated with the data symbols, such as based on the beamforming computations. The data postprocessing block 144 outputs the data 146 for further decoding of lower level data that has been received at the receiver 100.

Figure 5:
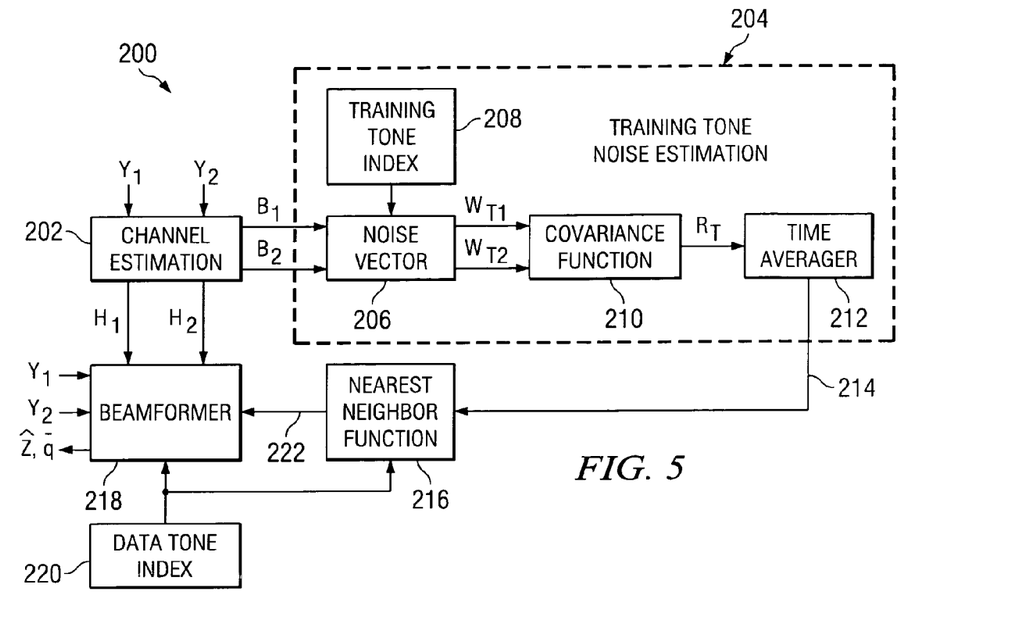
FIG. 5 is a functional block diagram illustrating an example of noise estimation and beamforming in accordance with an aspect of the present invention.

FIG. 5 is a functional block diagram of part of a receiver system 200 associated with noise estimation and beamforming procedures in accordance with an aspect of the present invention. The receiver portion 200 includes a channel estimator 202 that receives frequency domain data bursts or signals $Y_1$ and $Y_2$, such as have been digitized, filtered, and converted into the frequency domain by an appropriate FFT algorithm. The signals $Y_1$ and $Y_2$ correspond to signals received by different antennas of the receiver. The channel estimator 202 provides an indication of how the communication channel modified the magnitude and phase of training tones for data bursts that are received.

By way of example, the channel estimator 202 is programmed and/or configured to extract training tones from each of the signals $Y_1$ and $Y_2$. Scaling and demodulation can be applied to the extracted training tones to facilitate channel estimation. An IFFT algorithm is applied to the extracted training tones of each signal to convert the respective signals into time domain impulse responses. Additional scaling and filtering can be performed on the impulse response associated with each of the signals $Y_1$ and $Y_2$. A suitable FFT can then performed on the impulse responses to convert the time domain responses back into frequency domain signals. To facilitate subsequent processing, the channel estimator 202 can provide intermediate channel responses $B_1$ and $B_2$ for the respective input signals Y1 and Y2, such as might correspond to extracted training tones after the phase contribution of the training tones has been removed. Further, the channel estimator 202 provides full channel estimates $H_1$ and $H_2$ for the respective input signals $Y_1$ and $Y_2$, which have been processed as indicated above.

The intermediate channel responses $B_1$ and $B_2$ are provided to a training tone noise estimator 204 in accordance with an aspect of the present invention. The training tone noise estimator is programmed and/or configured to compute an estimate of noise for the training tones as a function of the intermediate channel responses $B_1$ and $B_2$.

In the example of FIG. 5, the training tone noise estimation includes a noise vector function 206. The function 206, for example, computes a noise vector for each of the training tones, which provides an indication of noise between a current data burst and a preceding data burst. For example, the noise vector algorithm computes a slip sensitive difference of training tones in a current data burst relative to respective training tones in a previous data burst.

The noise vector function 206 also can implement synchronization to compensate for detected slips (e.g., phase lead or phase lag) associated with the intermediate channel responses $B_1$ and $B_2$. The synchronization, commonly performed with a twiddle factor, can be applied to one of the terms of the vector algorithm, such as the training tone associated with the previous data burst. For example, forward or backward slips (phase lead or lag) can occur as a result of interference during transmission and/or as a result of the high data rates of the signals being transmitted.

A training tone index 208 is operative to index the computation of the function 206 so as to increment through the training tones. For example, to facilitate computing noise at the training tones, the index 208 can implement a bit-reversed order of the training tones (See, e.g., FIG. 3), which index values are provided to the function 206 to perform the estimation computation relative to each of the training tones being indexed.

By way of further illustration, Eq. 1 represents a computation that can be performed by the noise vector function 206, including a slip adjustment component (e.g., twiddle factor) that is applied to the intermediate channel response for a previous data burst. That is, Eq. 1 can be used to provide respective noise vectors $W_{T1}$ and $W_{T2}$ for the training tones of the intermediate channel responses $B[r,b]$ and $B[r,b-1]$.

$$W_T[k] = B[r, b] - e^{j\left(\frac{2\pi k}{v} - \pi\right)s} B[r, b-1] \quad \text{Eq. 1}$$

where:
B corresponds to the intermediate channel responses;
b is an index for the current data burst;
k is an index for each of the training tones, e.g., $k \in \{0,1, \ldots, v-1\}$;
s is a slip value for identifying slip characteristics (e.g., s=0 indicates no slip; s=−1 indicates forward slip; and s=1 indicates backward slip); and
r is the bit reversed value of the training tone index k.

The noise vector function 206 provides the quantities $W_{T1}$ and $W_{T2}$ to a covariance function 210 that is operative to compute the variance and correlation of the training tone noise based on the noise estimates $W_{T1}$ and $W_{T2}$. For example, the covariance function 210 constructs a covariance matrix RT based on the noise vectors $W_{T1}$ and $W_{T2}$, which provides an estimate of the training tone noise for the received signals.

By way of illustration, the covariance of the training tone noise can be computed from the noise vectors $W_{T1}$ and $W_{T2}$ of Eq. 1 as follows:

$$R_T[k] = \begin{bmatrix} |W_{T1}[k]|^2 & W_{T1}[k] \cdot W_{T2}^*[k] \\ W_{T1}^*[k] \cdot W_{T2}[k] & |W_{T2}[k]|^2 \end{bmatrix} \quad \text{Eq. 2}$$

$$= \begin{bmatrix} \sigma_{T1}^2[k] & \sigma_{T12}[k] \\ \sigma_{T12}^*[k] & \sigma_{T2}^2[k] \end{bmatrix}$$

for $k \in \{0, 1, \ldots, v-1\}$

Because of symmetry, only four real elements are actually computed; namely, the two diagonal elements and the real and imaginary parts of either off-diagonal element.

The covariance function 210 provides the covariance of the training tone noise $R_T$ to a time averager 212. The time averager 212 can be turned ON or OFF, as needed, such as by having its operation be selectable. For example, the time averager 212 can be a filter (e.g., a single pole filter) operative to smooth the training tone noise values over time.

Following the example of using a single pole filter for the averager 212, the computation for the averaged training tone noise can be expressed as:

$$R[k,b] = (1-\beta) \cdot R[k,b-1] + \tfrac{1}{2} \cdot \beta \cdot R_T[k,b] \quad \text{Eq. 3}$$

where $k \in \{0,1, \ldots, v-1\}$;
b is the index for the current data burst and
$\beta = 2^{-p}$, where $p \in \{0,1,2,3,4\}$.

Once the training tone noise estimates have been computed, they can be employed by a beamformer or other subsequent processing that might require an estimation of the signal noise in accordance with an aspect of the present invention.

In the example of FIG. 5, the time averager 212 provides an indication of the average training tone noise 214 to a nearest neighbor function 216 that is operatively associated with a beamformer 218 and a data tone index function 220. The nearest neighbor function 216 is operative to determine which training tone is closest to a given data tone, based on a data tone index value provided by the data tone index function 220. As a result, the nearest neighbor function 216 provides the beamformer 218 with a training tone noise estimate 222 corresponding to training tone that is closest to the data tone for which the beamforming computations are being performed based on the data tone index value. By way of example, the data tone index function 220 can employ a bit-reversed order of data tones to facilitate performing the beamformer computations.

The beamformer 218 is programmed and/or configured to compute an indication of signal relative to noise. For example, the beamformer 218 can compute soft decisions, indicated as output $\hat{Z}$, and NSR estimates, indicated as output $\bar{q}$, for the data tones in the received signals, such as based on the frequency domain inputs $Y_1$ and $Y_2$, channel estimates $H_1$ and $H_2$ from the channel estimation function, and the computed training tone noise $R_T$ (which may or not be time averaged) provided by the nearest neighbor function 216. It is to be appreciated that the beamformer 218 also could compute hard decisions for the signal and noise estimates. The outputs $\hat{Z}$ and $\bar{q}$, for example, are employed by subsequent processing stages to perform slicing, decoding and/or error correction based on the outputs so as to facilitate determining symbol values.

By way of further illustration, the soft decisions and NSR estimates $\hat{Z}$ and $\bar{q}$ can be computed according to the following equations:

$$\hat{Z}[k] = \frac{[H_1^*[r] \ H_2^*[r]][adjR[r]] \begin{bmatrix} Y_1[r] \\ Y_2[r] \end{bmatrix}}{[H_1^*[r] \ H_2^*[r]][adjR[r]] \begin{bmatrix} H_1[r] \\ H_2[r] \end{bmatrix}} \quad \text{Eq. 4}$$

and $$q[k] = \frac{detR[r]}{[H_1^*[r] \ H_2^*[r]][adjR[r]] \begin{bmatrix} H_1[r] \\ H_2[r] \end{bmatrix}} \quad \text{Eq. 5}$$

where $k \in \{0, 1, \ldots, N_{data}-1\}$ and r is the bit reversed value of the data tone index k.

Because the denominator in Eqs. 4 and 5 contains the average noise estimates, whose values are decimated, it is to be appreciated that the denominator calculations also could be decimated in accordance with an aspect of the present invention.

Figure 6:
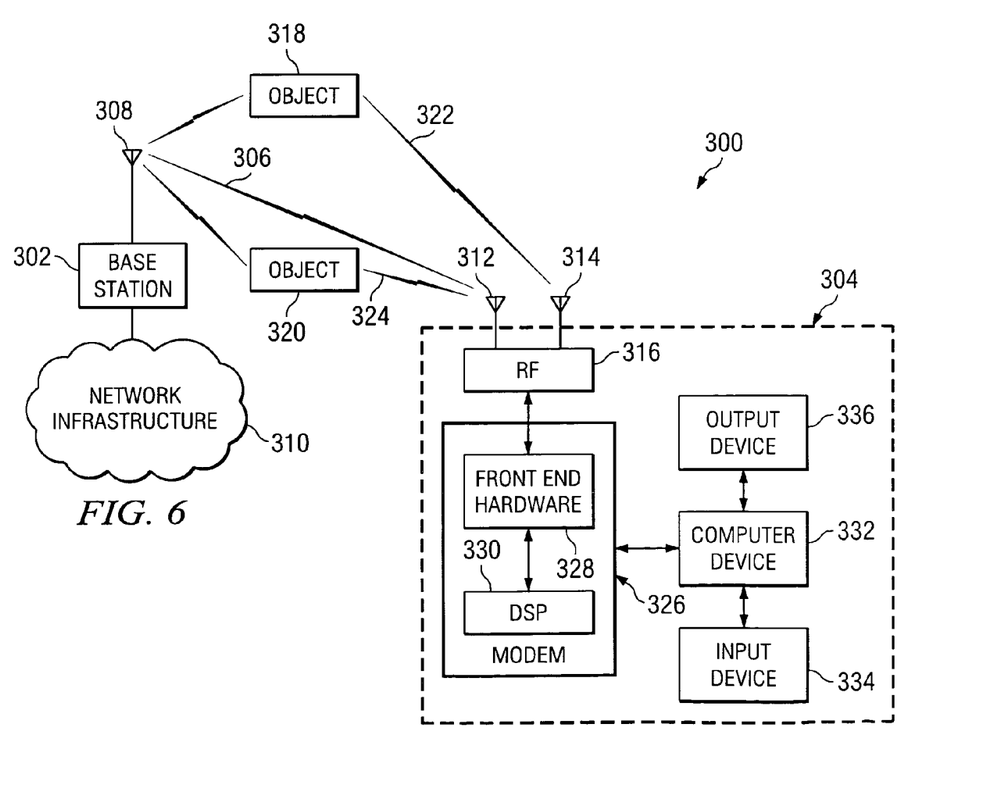
FIG. 6 illustrates an example of a wireless communications system that can employ a receiver in accordance with an aspect of the present invention.

FIG. 6 illustrates one example of a possible implementation of the present invention as it applies to a wireless communications system 300. The system includes a base station 302 and one or more subscriber units 304. The base station 302 includes a transceiver that is operative to both transmit and receive data signals 306 via an antenna system 308 (e.g., one or more antennas) wirelessly through an environment to selectively communicate information to and from the subscriber units 304. The base station 302 is coupled to a network infrastructure 310 via a server (not shown) or the like. The network infrastructure 310, for example, can include the Internet, an intranet or other type of network infrastructure. The base station 302 or its associated server (not shown) are programmed and/or configured to facilitate communication of network information relative to the network infrastructure 310 using a defined network protocol (e.g., TCP/IP, Fibre channel, etc.). The network information, for example, can include interactive video and/or audio data as well as other types of data.

For each data burst from the antenna system 308, the main data burst signal 306 is transmitted and received by one or more antennas 312 and 314 that are operatively coupled to a RF transceiver 316. The main data burst signal 306 usually reflects off one or more objects 318 and 320 in the environment, causing each of the antennas 312, 314 to receive a plurality of reflected signals 322 and 324 in addition to the main data burst signal 306. The transceiver 316 includes a receiving device that converts the received RF signals into corresponding electrical signals, which are transferred to a modem 326. The transceiver 316 also includes a transmitter coupled to the antennas 312, 314 for transmitting request data to the base station 302. It is to be understood and appreciated that, while the RF transceiver 316 is illustrated as being external to the modem 326 at the subscriber unit, the transceiver also could be integrated into the modem in accordance with an aspect of the present invention. Alternatively, the modem could be incorporated into a set top box, the antenna, a personal computer, a hand-held computer, and/or other microprocessor-based appliance.

The modem 326 includes front end hardware and/or software 328 coupled to receive analog signals from the transceiver 316. The front end 328 is programmed and/or configured to amplify, filter and/or digitize the electrical signals corresponding to signals or bursts received at the antennas 312, 314. The front end 328, for example, is coupled to signal processor 330, which can be implemented within a DSP, an ASIC or other signal processing component 330 that is programmed and/or configured to process the digitized signal in accordance with an aspect of the present invention. That is, the signal processor 330 is operative to extract training tones from the digitized signals and perform noise estimates on the extracted training tones. When the modem receives wireless signals from more than one antenna, such as in the example of FIG. 6, noise estimates are performed on signals from each of the antennas. Further, the signal processor 330 can employ the noise estimates to perform additional computations to derive constellation symbol estimates, such as in the form of soft decisions and NSR estimates. The computations for each data tone are calculated based on the noise estimate for the nearest training tone relative to the respective data tone. After the constellation symbol estimates have been computed, the signal processor 330 can perform further processing, such as hard or soft slicing and then decoding and demodulation based on the sliced constellation symbol estimates.

The modem 326 is coupled to a computer device 332, which handles additional processing steps and provides a mechanism for user interaction with the information being communicated through the communications system. The computer device 332, for example, can be a personal computer, an Internet appliance, or other microprocessor-based device operative to receive and/or send information relative to the modem 326. It is to be understood and appreciated that the modem 326 also could be integrated into the computer device 332.

The computer device 332 is coupled to an input device 334 for receiving instructions from a user directly or indirectly by a remote link. An output device 336 is also provided, so that selection information and requests can be displayed to the user. The computer device 332 can include computer-executable instructions for providing task selections, requests and control to a user and allowing a user to interact with information available over the network infrastructure 310. It will be understood and appreciated that the applicability of the present invention is not limited to a particular configuration of communications system and those skilled in the art further will appreciate many other communication implementations that can be employed in accordance with an aspect of the present invention.

Figure 7:
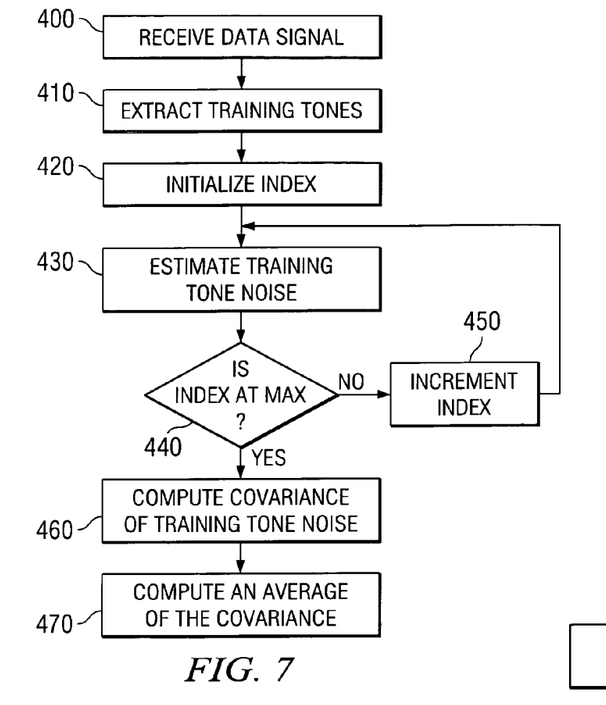
FIG. 7 is a flow diagram illustrating a methodology for estimating noise in accordance with an aspect of the present invention.
Figure 8:
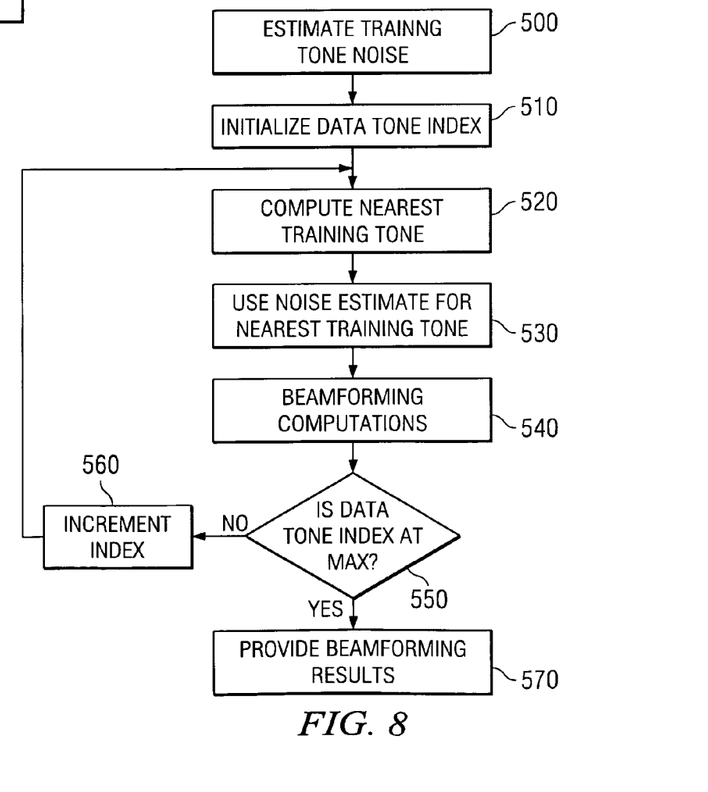
FIG. 8 is a flow diagram illustrating a methodology for beamforming in accordance with an aspect of the present invention.

In view of the foregoing structural and functional features described above, a methodology in accordance with various aspects of the present invention will be better appreciated with reference to FIGS. 7-8. While, for purposes of simplicity of explanation, the methodologies of FIGS. 7-8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates an example of a methodology to perform noise estimation on a signal in accordance with an aspect of the present invention. The methodololgy can be implemented as hardware and/or software, such as by a DSP or an ASIC. The methodology begins at 400, in which a data signal or burst is received. Preprocessing also can be performed on the received signal, such as amplification, filtering, digitization and/or conversion of the received signal into the frequency domain. While the following example describes the noise estimation methodology as being performed on a single data signal, it is to be appreciated that the methodology can be implemented on more than one signal in accordance with an aspect of the present invention. Additionally, the noise estimation procedure can be implemented on both wired and wireless data signals, although, for purposes of brevity, the following describes the procedure as applied to a wireless signal. That is, the methodology has applications on any type of communications system that employs training or pilot tones.

Next, at 410, training tones are extracted from a digitized signal, such as a wireless data signal or burst that has been received, digitized and converted to the frequency domain. The training tone extraction can be part of a channel estimation procedure as described herein. The extracted training tones can be stored in memory such as RAM, SDRAM or other volatile or nonvolatile memory.

At 420 a training tone index is initialized. The training tone index provides an index value that is employed to select on which training tone noise estimation is performed in accordance with an aspect of the present invention. The index can be implemented in any form, such as a sequential or bit-reversed order, depending on how the training tone data is stored. From 420, the methodology proceeds to 430 in which the noise at a first training tone (as incremented by the index) is computed. The estimation at 430, for example, can be calculated as set forth in Eq. 1 above.

Next, at 440, a determination is made as to whether the training tone index has reached its maximum value, such as to indicate that a noise estimation computation has been performed on all desired training tones. If the determination at 440 is negative, the methodology proceeds to 450 in which the index is incremented. From 450, the methodology returns to 430 in which training tone noise is estimated for the next training tone, as indicated by the index. For example, the index can increment from zero to ν−1 (or from 1 to ν), to perform noise relative to each of the ν training tones in the received data burst.

After training tone noise has been estimated for all desired training tones, the methodology proceeds from 440 to 460. At 460, a covariance of the training tone noise is computed to provide a covariance matrix. The covariance matrix, for example, can be computed according to Eq. 2. Next, at 470, a time average of the results of the covariance matrix can be computed to provide a time averaged representation of the estimated noise at the respective training tones. For example, a single pole filter (e.g., see Eq. 3) can be employed to perform desired averaging, although other forms of averaging components (e.g., hardware or software) also could be implemented. Alternatively, the time averaging can be an optional feature that can be omitted from the noise estimation procedure, if desired.

FIG. 8 illustrates a beamforming methodology that can be implemented relative to a data signal or burst in accordance with an aspect of the present invention. The methodology begins at 500 in which training tone noise is estimated for one or more data signals or bursts, such as preprocessed signals received at one or more antennas. The training tone noise estimation, for example, can be implemented in a manner consistent with the methodology described above with respect to FIG. 7. After training tone noise has been estimated, the methodology proceeds to 510.

At 510, a data tone index is initialized to a starting value (e.g., 0). The data tone index value indicates for which data tone the beamforming computations are to be implemented. The data tone index, for example, can be employed to increment beamforming computations sequentially through each data tone. Alternatively, the data tone index can increment through data tones in a bit-reversed order.

Next, at 520, an indication of the nearest training tone is computed based on the data tone index value. That is, the nearest training tone corresponds to a training tone interspersed in the data burst that is located the closest relative to the data tone identified by the data tone index value. Appropriate rounding (e.g., up or down) can be utilized for situations when a data tone is positioned midway between an adjacent pair of training tones. From 520, the methodology proceeds to 530 in which the noise estimate for the nearest training tone is obtained for use in subsequent beamforming computations. The noise estimate can be a time averaged value of the noise estimate.

At 540, beamforming computations are performed for the indexed data tone to provide an indication of the signal relative to noise for the indexed data tone. For example, the beamforming computations can include calculating soft decisions and NSR estimates for the indexed data tone, such as based on the noise estimate for the nearest training tone (530), a channel estimate of the data burst, and frequency domain signals corresponding to the one or more received signals. By way of further illustration, the computation at 540 can be implemented according to Eqs. 4 and 5. From 540, the methodology proceeds to 550.

At 550, a determination is made as to whether the data tone index is at its maximum value, which would indicate that the beamforming computations at 540 have been implemented for all desired data tones. If the determination is negative, indicating that computations are required for additional data tones, the methodology proceeds to 560. At 560, the data tone index is incremented to a value to select the next data tone. From 560, the methodology returns to 520 in which 520 through 550 are repeated for the next data tone. If the determination at 550 is affirmative, the methodology proceeds to 570 in which the beamforming computations, such as including soft decisions and NSR estimates, for the data tones are provided. It is to be appreciated that the foregoing methodology usually is repeated for each data signal or burst that is received.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for computing beamforming for signals in a communication system comprising:

receiving a signal having a plurality of tones over a communication channel, some of the plurality of tones being of a first type and some of the plurality of tones being of a second type;

performing channel estimation on the received signal to provide a channel estimate of the communication channel;

estimating noise on the received signal for each of a plurality of the first type of tones to provide a corresponding noise estimate for each of the plurality of the first type of tones; and computing beamforming for at least one tone of a plurality of the second type of tones based on the channel estimate and based on the noise estimate of at least one of the plurality of the first type of tones that is nearest the at least one tone of the plurality of the second type of tones in the received signal.

2. A method according to claim 1, wherein the estimating noise further comprises:
computing a first indication of difference between a first one of the first type of tones in one burst relative to the first one of the first type of tones in a preceding burst;
computing a second indication of variance and correlation of the first indication; and
averaging the second indication over time to provide an average indication of noise that defines the noise estimate for at least one of the plurality of the first type of tones.

3. A method according to claim 1, wherein the received signal is a multi-carrier signal;
the first type of tones are training tones; and
the second type of tones are data tones.

4. A method according to claim 1, wherein the computing beamforming further comprises:
computing at least one of soft decisions and noise to signal ratio estimates for the at least one of the plurality of the second type of tones.

5. A method according to claim 1, wherein the performing channel estimation further comprises:
extracting the plurality of the first type of tones from the received signal, the channel estimation being performed based on the plurality of the first type of tones extracted from the received signal;
the estimating noise being performed for each of the plurality of the first type of tones extracted from the received signal.

6. A communication receiver configured to compute beamforming for signals in a communication system comprising:
means for receiving a signal over a communication channel, wherein the signal comprises a plurality of tones, the plurality tones comprising a plurality of a first type of tones and a plurality of second type of tones;
means for determining a channel estimate for the communication channel;
means for estimating noise for a plurality of the first type of tones in the received signal; and
means for computing beamforming for at least one of a plurality of the second type of tones based on the determined channel estimate and the estimated noise of at least one of the plurality of the first type of tones that is nearest a respective one of the plurality of the second type of tones in the received signal.

7. A communication receiver according to claim 6, further comprising:
means for computing a first indication of difference between a first one of the first type of tones in one burst relative to the first one of the first type of tones in a preceding burst;
means for computing a second indication of variance and correlation of the first indication; and
means for averaging the second indication over time to define the estimated noise of the at least one of the plurality of the first type of tones.

8. A communication receiver according to claim 6, wherein the signal is a multiple carrier signal;
the first type of tones are training tones; and
the second type of tones are data tones.

9. A communication receiver according to claim 6, wherein the beamforming further comprises at least one of soft decisions and noise to signal ratio estimates computed by the means for computing beamforming for the at least one of the plurality of the second type of tones.

10. A communication receiver comprising:
a tone extractor configured to extract a plurality of first type of tones from a signal received over a communication channel;
a channel estimator configured to provide a channel estimate for the communication channel;
a noise estimator configured to estimate noise for the extracted plurality of the first type of tones and provide a noise estimate for the plurality of the first type of tones; and
a beamformer configured to compute beamforming for a plurality of a second type of tones in the received signal based on the channel estimate and based on the noise estimate of the extracted plurality of the first type of tones that are nearest to respective ones of the second type of tones in the received signal.

11. A communication receiver according to claim 10, wherein the received signal is a multiple carrier signal;
the first type of tones are training tones; and
the second type of tones are data tones.

12. A communication receiver according to claim 10, further comprising:
an indexing function that selects an indexed second type of tone from the plurality of the second type of tones for which a current beamforming computation is to be performed; and
a noise selection function operative to select one of the plurality of the first type of tones nearest to the indexed second type of tone, the respective beamforming computation for the indexed second type of tone employing the computed noise estimation for the selected one of the plurality of the first type of tones.

13. A communication receiver according to claim 10, wherein the beamformer is further configured to compute at least one of soft decisions and noise to signal ratio estimates for at least some of the second type of tones.

14. A communication receiver of claim 10 being implemented as part of an application specific integrated circuit.

15. A communication receiver of claim 10 being implemented as executable instructions programmed in a digital signal processor.

16. A communication receiver of claim 10, wherein the plurality of the first type of tones are interspersed throughout the received signal and fewer in number than the plurality of the second type of tones in the received signal.

17. A wireless communications system, comprising:
at least one antenna operative to receive a wireless signal over a communication channel and convert the received signal into a corresponding electrical signal;
a preprocessing system operative to process the electronic signal and convert the corresponding electrical into a digital signal and perform desired preprocessing of the digital signal to provide a preprocessed digital signal in the frequency domain having a plurality of tones, some of the plurality of tones being of a first type and others of the plurality of tones being of a second type, the tones of the first type having a fewer number of tones than the tones of the second type;
a channel estimator operative to characterize the communication channel and provide a channel estimate thereof;

a noise estimator operative to estimate noise for tones of the preprocessed digital signal of the first type and to provide an indication of estimated noise for the tones of the first type; and a beamformer operative to perform beamforming computations for tones of the first preprocessed digital signal of the second type, the beamforming computations employing the channel estimate and the indication of estimated noise for a tone of the first type nearest each respective tone of the second type; and an indexing function that selects an indexed second type of tone from the plurality of the second type of tones for which a current beamforming computation is to be performed; and a noise selection function operative to select one of the plurality of the first type of tones nearest to the indexed second type of tone, the respective beamforming computation for the indexed second type of tone employing the computed noise estimation for the selected one of the plurality of the first type of tones.

18. The system of claim 17, wherein the tones of the preprocessed digital signal conforming to a multiple carrier modulation technique in which the first type of tones corresponds to training tones and the second type of tones corresponds to data tones.

* * * * *